US009221639B2

(12) United States Patent
Wierenga

(10) Patent No.: US 9,221,639 B2
(45) Date of Patent: Dec. 29, 2015

(54) GRAIN BAG WINDER

(71) Applicant: Neeralta Manufacturing Inc., Neerlandia (CA)

(72) Inventor: Lambert Wierenga, Barrhead (CA)

(73) Assignee: NEERALTA MANUFACTURING INC., Neerlandia, Alberta (CA)

(*) Notice: Subject to any disclaimer, the term of this patent is extended or adjusted under 35 U.S.C. 154(b) by 0 days.

(21) Appl. No.: 14/205,238

(22) Filed: Mar. 11, 2014

(65) Prior Publication Data

US 2014/0263810 A1 Sep. 18, 2014

Related U.S. Application Data

(60) Provisional application No. 61/777,501, filed on Mar. 12, 2013, provisional application No. 61/908,976, filed on Nov. 26, 2013.

(51) Int. Cl.
*A01F 25/20* (2006.01)
*B65H 18/10* (2006.01)

(52) U.S. Cl.
CPC ............. *B65H 18/10* (2013.01); *A01F 25/20* (2013.01); *B65H 2301/418526* (2013.01); *B65H 2701/191* (2013.01)

(58) Field of Classification Search
CPC ..... A01F 25/2027; A01F 25/20; B65H 18/10; A01G 13/0287; A01G 2013/0218
USPC ........................................... 242/596.4–596.7
See application file for complete search history.

(56) References Cited

U.S. PATENT DOCUMENTS

| 3,687,392 | A | * | 8/1972 | Parry | 242/533.8 |
| 3,966,139 | A | * | 6/1976 | Terpak | 242/118.7 |
| 5,386,876 | A | * | 2/1995 | Lavo | 171/43 |
| 5,628,168 | A | | 5/1997 | Inman et al. | |
| 5,956,923 | A | * | 9/1999 | Andros et al. | 53/397 |

(Continued)

FOREIGN PATENT DOCUMENTS

DE 4041280 A1 6/1992
JP H0690611 A 4/1994

(Continued)

OTHER PUBLICATIONS

Brown Bros. Welding Bag Roller product and video, video uploaded Mar. 16, 2011, available at http://brownbroswelding.com/rollers/.*

(Continued)

*Primary Examiner* — Saul Rodriguez
*Assistant Examiner* — Mark Hageman
(74) *Attorney, Agent, or Firm* — Brion Raffoul

(57) ABSTRACT

Systems methods and devices for packaging used grain bags as the grain bags are being unloaded. The system is located at the top of a grain unloader machine or a grain extractor machine. The invention uses a pair of plates with retractable winding cores placed at the center of each plate. At the start of the unloading process, the end of a grain bag is attached to both the retractable winding cores. As the grain bag is unloaded, the unloader moves down the length of the grain bag. The portion of the grain bag that is emptied is rolled up by the rotating winding cores. The winding cores are powered by one or two external motors controlled by a user. Once the empty grain bag has been completely rolled up, the retractable winding cores can be retracted.

17 Claims, 17 Drawing Sheets

(56) References Cited

U.S. PATENT DOCUMENTS

| | | | |
|---|---|---|---|
| 7,802,956 B2* | 9/2010 | Schertz et al. | 414/403 |
| 7,861,851 B2 | 1/2011 | Dekoning | |
| 7,997,849 B2 | 8/2011 | Twiestmeyer et al. | |
| 8,167,526 B2 | 5/2012 | Schertz et al. | |
| 8,302,699 B2* | 11/2012 | Rocca | 171/45 |
| 8,602,710 B2 | 12/2013 | Lambertini | |
| 2009/0041566 A1 | 2/2009 | Lambertini | |
| 2009/0311080 A1* | 12/2009 | Hilsabeck et al. | 414/310 |
| 2012/0189413 A1 | 7/2012 | Richiger | |
| 2013/0177372 A1 | 7/2013 | De Koning | |

FOREIGN PATENT DOCUMENTS

| | | |
|---|---|---|
| JP | H10337102 A | 12/1998 |
| JP | 2004041114 A | 2/2004 |
| JP | 2004236593 A | 8/2004 |
| JP | 2006000050 A | 1/2006 |
| JP | 2006055053 A | 3/2006 |
| JP | 2006109736 A | 4/2006 |
| JP | 2005151919 A | 6/2006 |
| JP | 2007202525 A | 8/2007 |
| JP | 2011019418 A | 2/2011 |
| JP | 2011142884 A | 7/2011 |
| JP | 2011155938 A | 8/2011 |
| JP | 2012065615 A | 4/2012 |

OTHER PUBLICATIONS

GBSS Bag winder product video, uploaded May 18, 2010, available at https://www.youtube.com/watch?v=EUuJcAT2uwQ.*
Kirchner Machine Ltd plastic roller video, uploaded Nov. 8, 2010, available at https://www.youtube.com/watch?v=4R-0IHj08W1.*
GLSYSTEM12, HD Grain Bag Loader, p. 7, Loftness Complete GL12 Brochure, 2011.

* cited by examiner

GRAIN BAG WINDER

RELATED APPLICATIONS

This application is a non-provisional application of U.S. Provisional Patent Application No. 61/777,501 filed Mar. 12, 2013.

TECHNICAL FIELD

The present invention relates to grain bags. More specifically, the present invention relates to a roller mechanism for rolling up used grain bags as the grain is being unloaded from the grain bag.

BACKGROUND OF THE INVENTION

The agriculture industry has significantly changed in the last few decades. Less and less farmers are feeding more and more people. To this end, labor saving devices are in higher demand so that less labor is required to perform the same functions.

The use of grain bags for storing grain is now a standard industry practice, especially on North and South American farms. The grain bags are large plastic bags in which the grain is stored in the winter months. The grain is placed into the grain bags using grain bagger machines that push the grain into the bags. The bags are then sealed. To unload the bags, a grain unloader machine is used. These grain unloader machines use either augers or suction to pull the grain from the bag. The grain is then conveyed to a truck for transport to a processing facility.

One problem with grain bags is their size—they range from anywhere from 9 to 12 feet in diameter and can be 200 to 500 feet in length. While they necessarily have to be such large sizes, once these bags are emptied of their contents, disposing of the grain bags themselves can be problematic. There are now initiatives for recycling these bags. However, given the size of these grain bags, gathering these up can be difficult and transporting the bags can similarly be difficult if these are not properly rolled up or otherwise neatly packaged.

Currently, after the bags have been emptied, the bags are manually rolled up into rolls and hauled, by way of tractors or forklifts, onto trucks for transportation to a recycling center or for disposal. There are devices available that allow users to roll up the used grain bags after they are laid flat on the ground. Some unloader machines are equipped with rolling mechanisms that roll up the used bags once the bags have been emptied. Other unloader machines are even equipped with mechanisms that roll up the bags as they are being emptied. However, some of these mechanisms are not very convenient. Some mechanisms require that the rolled up grain bag be unrolled from the non-removable spindle attached to the unloader machine. Other mechanisms produce two rolls from a single grain bag, thereby doubling the amount of work required to dispose of the used grain bag. All of these mechanisms require that the rolled up used grain bags be manually loaded on to the transport before disposal. As can be imagined, the manual loading of large rolled up plastic grain bags is not an easy task. This labor dramatically increases when bags are not rolled up tightly. It should also be noted that bags which have not been tightly rolled up are much more vulnerable to rodent infestation.

Based on the above, there is therefore a need for methods, devices, and systems which mitigate if not overcome the problems with the prior art.

SUMMARY OF INVENTION

The present invention provides systems, methods, and devices for packaging used grain bags as the grain bags are being unloaded. The system is located at the top of a grain bag unloader machine or a grain extractor machine. The invention uses a pair of plates with retractable winding cores placed at the center of each plate. At the start of the unloading process, the end of a grain bag is attached to both the retractable winding cores. As the grain bag is unloaded, the unloader moves or delves deeper into the grain bag. The portion of the grain bag that is emptied is rolled up by the rotating winding cores. The winding cores are powered by one or two external motors controlled by a user. As the empty portion of the grain bag is rolled up, the rolled up grain bag is located between the two plates. Once the empty grain bag has been completely rolled up, the retractable winding cores can be retracted. By retracting the winding cores, the rolled up grain bag can be freely rolled on to the back of a truck or transport vehicle.

Preferably, at least one of the retractable winding cores comprises a number of triangularly shaped elongated fingers, each finger protruding towards the other winding core. Each or at least one of the plates may rotate with the winding cores and may, depending on configuration, be configured to slide away from each other to thereby increase the gap between the plates. With the winding cores retracted, sliding the plates to result in this increased gap allows the rolled up grain bag to be released from between the plates. In one configuration, only one of the winding cores is powered—the other winding core is interlocked with the powered winding core and is driven by the powered winding core. In another configuration, the two winding cores are simultaneously driven by a single hydraulic circuit with each winding core having its own hydraulic gearbox.

In a further configuration, the winding cores can be independently powered by separate motors. The separate motors can be separately operated by a user to take up whatever slack is present on the used grain bag. As the grain bag is emptied and as the unloader drives deeper into the grain bag, the user activates the motors as necessary to rotate the winding core and roll up whatever portion of the grain bag is emptied. In another embodiment, the each winding core has its own hydraulic motor. For ease of implementation, these two motors can be driven in parallel off of a single hydraulic circuit.

To guide the rolled up grain bag as it rolls off the system, the system may be equipped with a pair of guide rails or arms pointed towards a transport vehicle for transporting the used grain bag. These guide rails or arms can be removable or can be pivotably movable such that they are only present when required.

In one aspect, the present invention provides a system for packaging a grain bag as said grain bag is emptied by a grain extractor, the system comprising:
  a pair of plates placed opposite one another, a gap between said plates having a predefined width, each plate having a void at a middle of said plate;
  at least one elongated winding core, the or each winding core having a deployed and a retracted position, the or each winding core being placed through at least one of said voids in a corresponding plate when in a deployed position, said at least one winding core being constructed and arranged to attach to said grain bag, said at least one winding core being rotatable about an axis perpendicular to said plates, said axis being parallel to a longitudinal axis of said at least one winding core;

at least one motor for rotating said at least one elongated winding core about said elongated winding core's longitudinal axis
wherein
said plates and said at least one winding core are located atop said grain extractor;
when the or each winding core is in a deployed position, the or each winding core is in said gap between said plates;
the or each winding core transitions from said deployed position to said retracted position by being retracted from said void, the or each winding core travelling along said axis when transitioning from said deployed position to said retracted position;
when said at least one winding core rotates about its longitudinal axis, said grain bag is rolled about said at least one winding core;
retracting said at least one winding core after said grain bag has been rolled about said at least one winding core allows said rolled grain bag to fall from between said plates.

In another aspect, the present invention provides a grain extractor for extracting grain from a grain bag, the grain extractor comprising:
a pair of plates placed opposite one another, each plate having a void at a middle of said plate, said pair of plates being separated by a gap;
at least one elongated winding core, the or each winding core being for deployment through at least one of said voids, the or each winding core being retractable through said void;
wherein
said at least one winding core being rotatable about its longitudinal axis to roll up said grain bag as said grain bag is emptied by said grain extractor;
said pair of plates and said at least one winding core being positioned atop said grain extractor.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
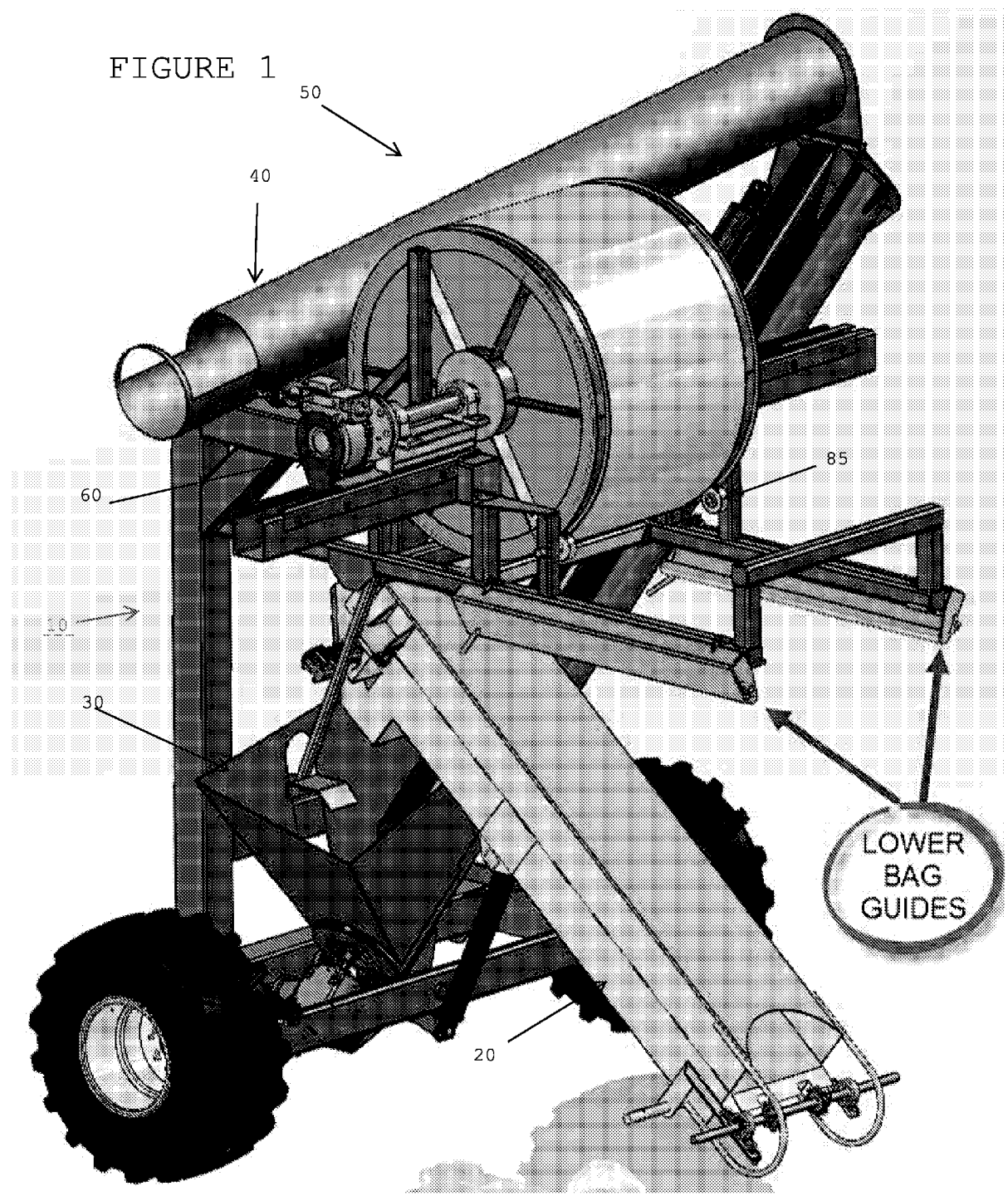
FIG. 1 is an illustration of an extractor using a grain bag winder according to one aspect of the invention.
Figure 2:
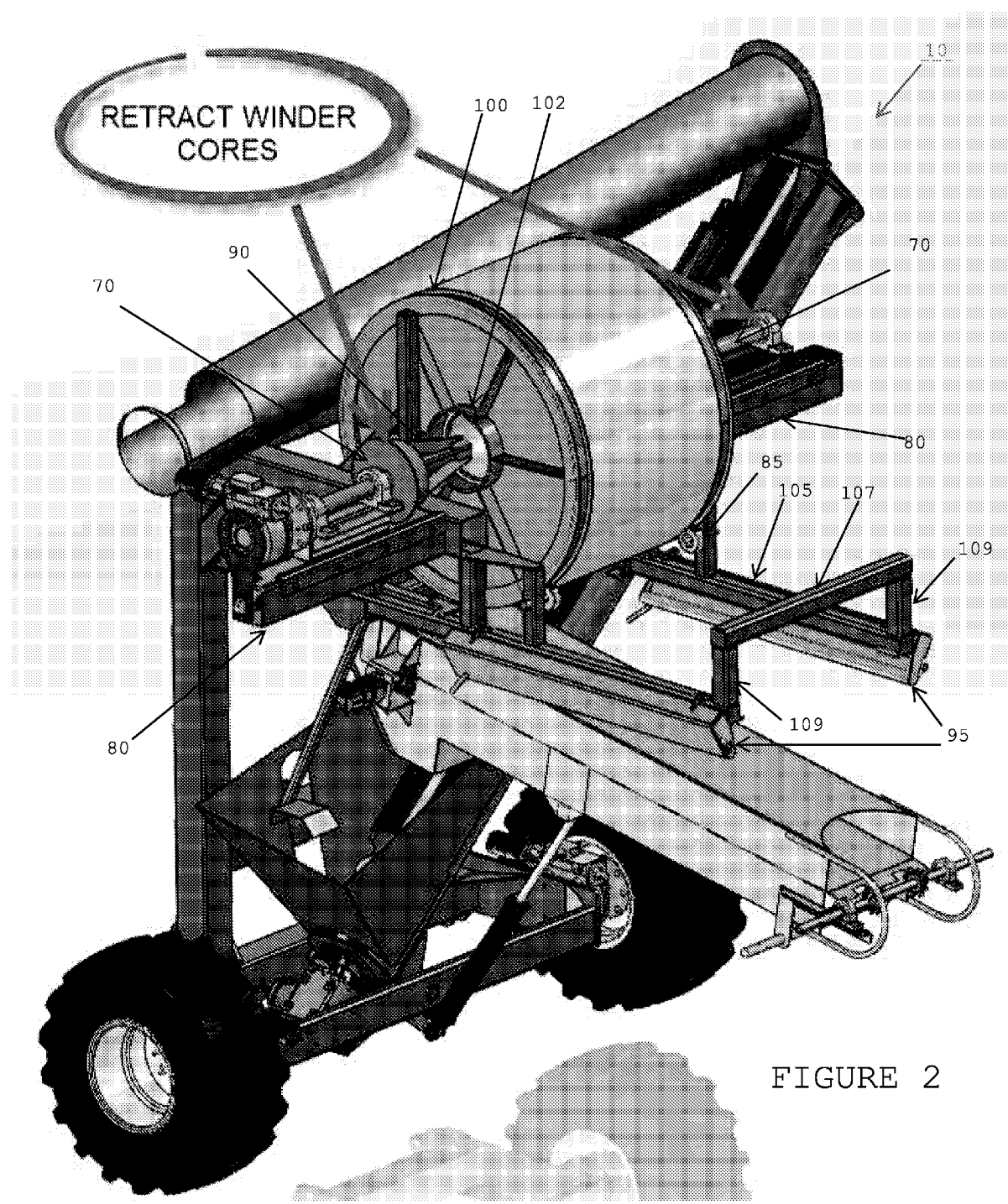
FIG. 2 illustrates the extractor illustrated in FIG. 1 with the grain elevator raised.

Referring to FIGS. 1 and 2, a grain extractor with the invention attached is illustrated. The grain extractor 10 is equipped with a grain elevator 20. An auger system (not shown) can be attached at the bottom of the elevator and the auger system is usually deployed inside a grain bag. The auger system moves grain from within the grain bag to the grain elevator and up the grain elevator to the hopper 30. The grain is then moved up the hopper to a grain storage (usually a truck for transport) by way of a grain pipe 40.

Atop the extractor 10 is a grain bag winder 50. The grain bag winder has a motor 60 which powers one of two winder cores 70 (see FIG. 2). The two winder cores 70 are both on tracks 80 such that the cores can travel longitudinally along the tracks and can be deployed and retracted as necessary. The winder cores have multiple fingers 90 with the fingers on one winder core locking or mating with the fingers of the other winder core to form a single winding core.

The grain bag winder also has a pair of plates 100 which hold the wound up grain bag between them. The plates are rotatable with the grain bag being wound up. At the center of each plate is a hole or void 102 through which a winder core passes. When deployed, the winder cores 70 are preferably flush with the plates and the winder core fingers are intertwined or interlocked with each other in the space or gap between the two plates. When the winder cores are deployed, these winder cores hold the plates in place such that there is a fixed first distance between the two plates. When the winder cores are retracted, the plates are allowed to slide away from each other, thereby increasing the gap between the plates to a second distance. As can be imagined, the first distance is smaller than the second distance. The plates are supported by small wheels 85. Each plate is supported by a pair of these small wheels 85 (one front wheel and one back wheel) and each plate can slide transversally along the small wheels 85.

The grain bag winder 50 is also equipped with arms 105, one on each side of the rolled up grain bag. These arms are located below the rolled up grain bag. These arms also extend outwardly or away from the rolled up grain bag and extend towards a direction of travel of the extractor when the rolled up or wound up grain bag is being removed. A bridge 107 connects the two arms and is spaced from the two arms by risers 109. When in use, the section of the empty grain bag being rolled up passes between the two arms and underneath the bridge 107. Each of the arms 105 is equipped with a guide 95. The guides 95 are hinged to be in a deployed position or in a loose position. In FIGS. 1 and 2, the guides 95 are illustrated in a loose position. When in a loose position, the guides act to guide the rolled up bag down the elevator 20. In a deployed position, the guides 95 act to guide the empty grain bag as it is rolled up on the winding cores 90.

Figure 3:
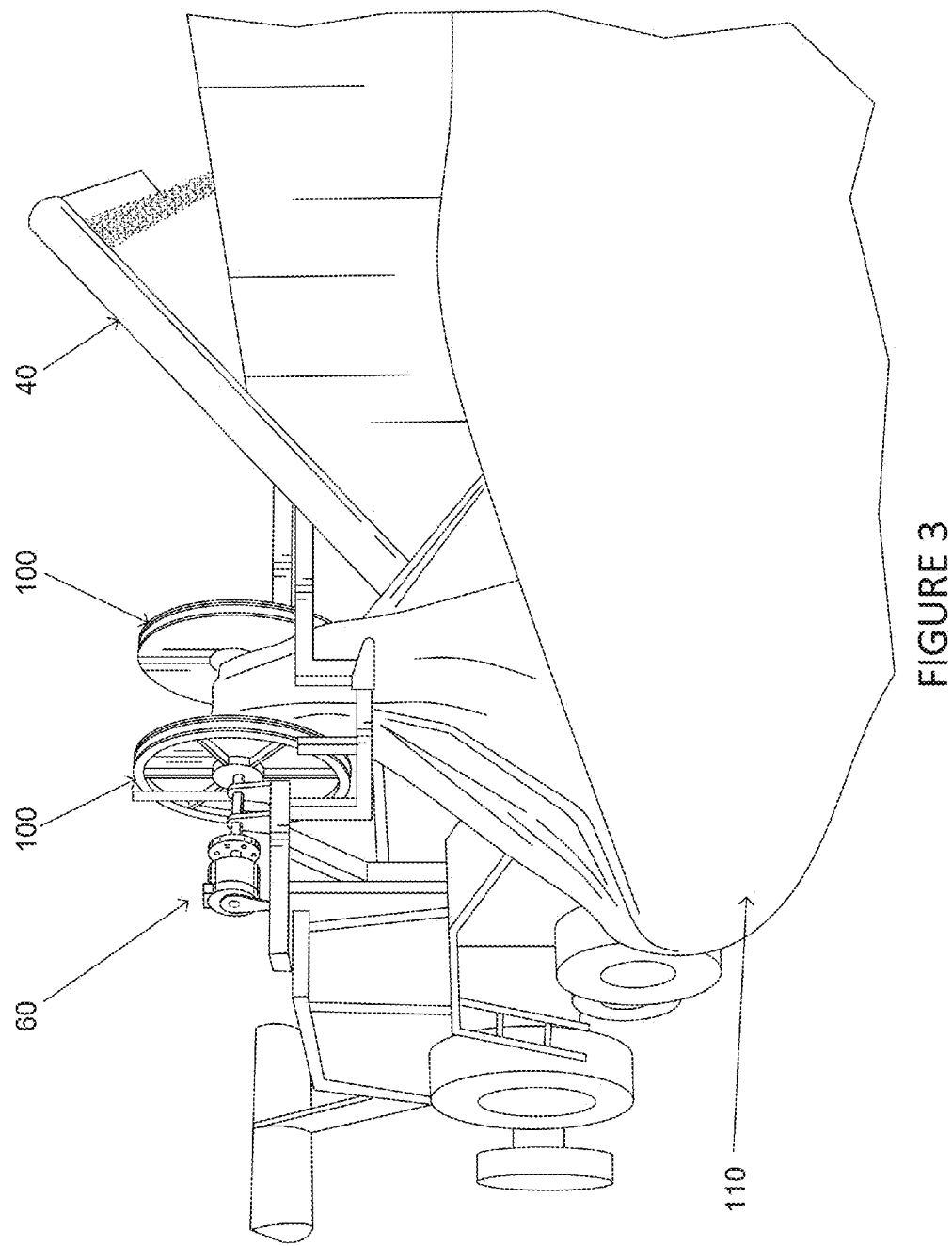
FIG. 3 illustrates the extractor in use and showing the grain bag being rolled up.

Referring to FIG. 3, an illustration of the extractor and the invention in use is provided. A grain bag 110 filled with grain is being emptied by the extractor 10. The auger system (not shown) is inside the grain bag and, as the grain bag is emptied, the empty portions are wound up by the grain bag winder. Visible in FIG. 3 are the plates 100 and the motor 60 of the grain bag winder. The distance or gap between the two plates 100 when the winding cores are deployed may be predetermined and set such that the rolled up grain bag has a set width. Once retracted, the winding cores allow the plates 100 to slide away from each other, thereby releasing the rolled up grain bag.

Figure 4:
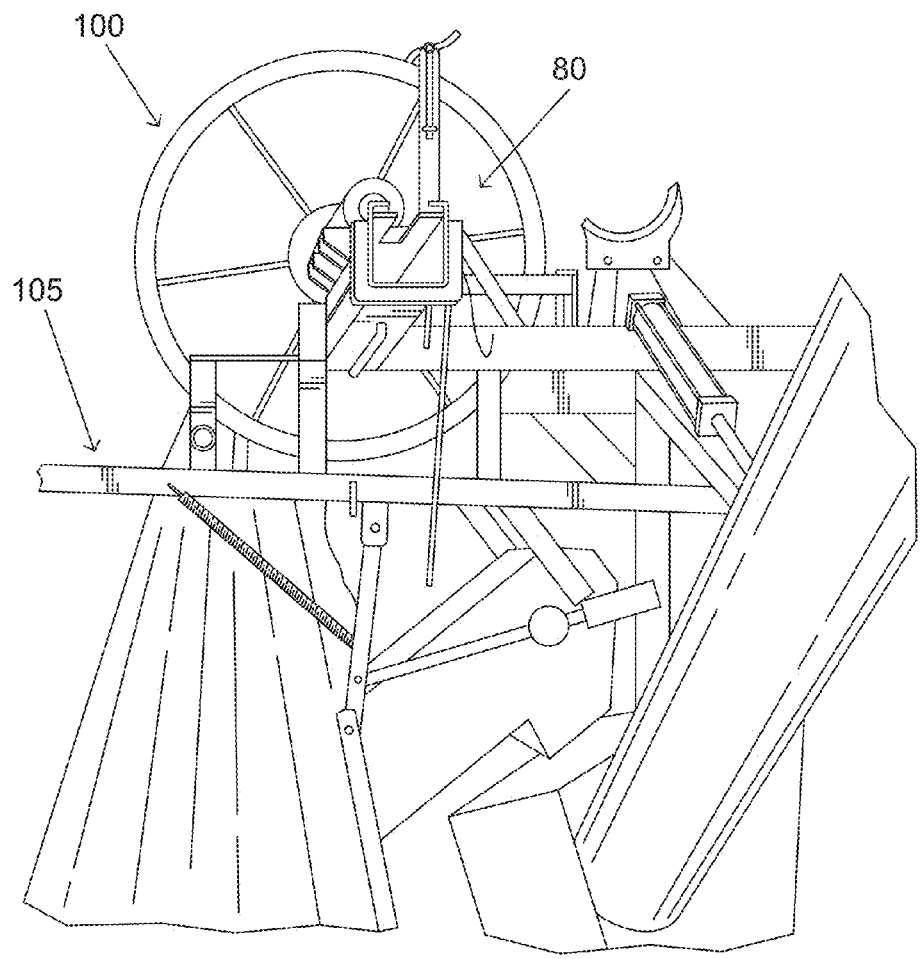
FIG. 4 illustrates another view of the extractor showing details of the grain bag winder in use.

Referring to FIG. 4, a side view of the grain bag winder in use is illustrated. As can be seen, the empty grain bag 110 is being rolled up using the intertwined or interlocked fingers 90. It should be noted that the elevator is not visible as the elevator is inside the grain bag.

Figure 4A:
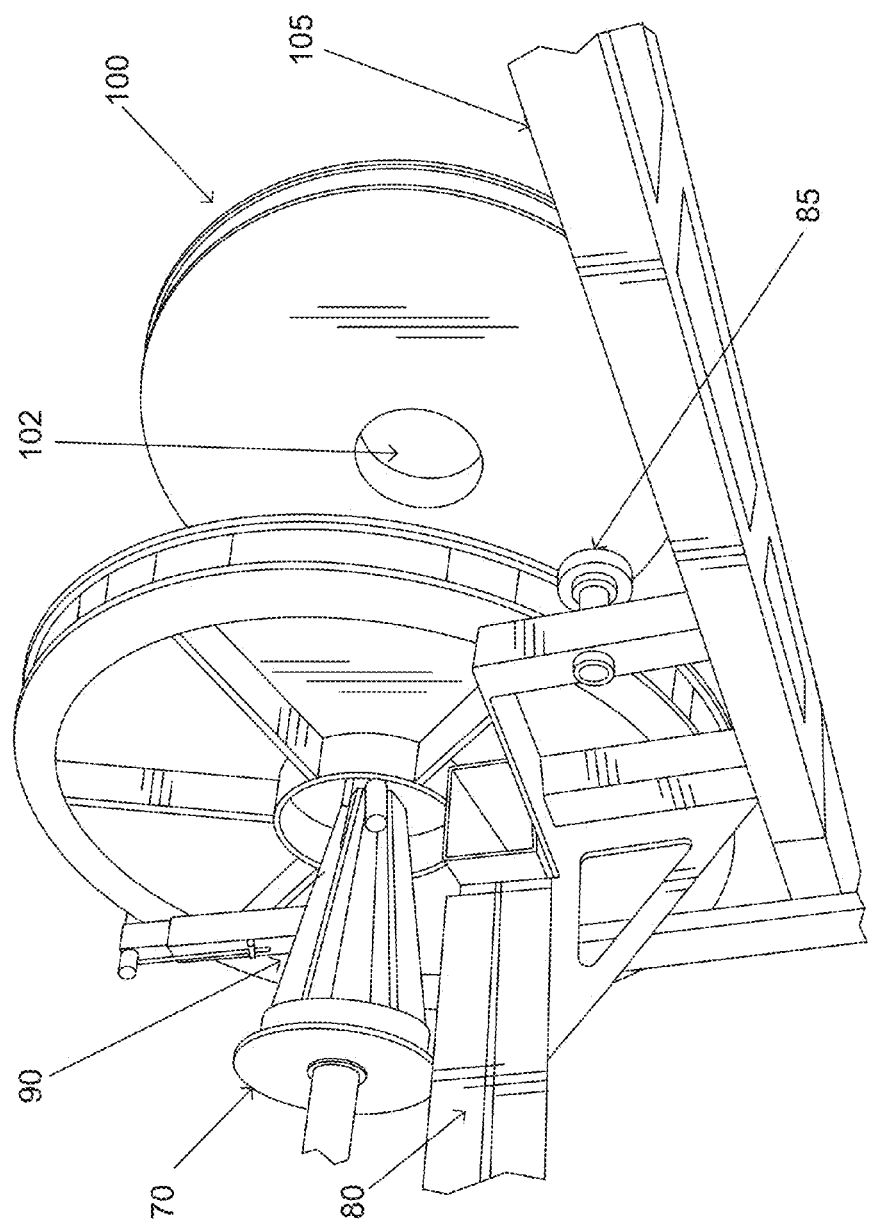
FIG. 4A is a side oblique view of the grain bag winder with the winding cores in a retracted position.

Referring to FIG. 4A, an oblique view of the grain bag winder with the winder cores 90 in a retracted position is shown. When in a retracted position, the winder cores are retracted through the holes 102 on the plates 100 and are placed outside the gap between the plates 100.

Figure 4B:
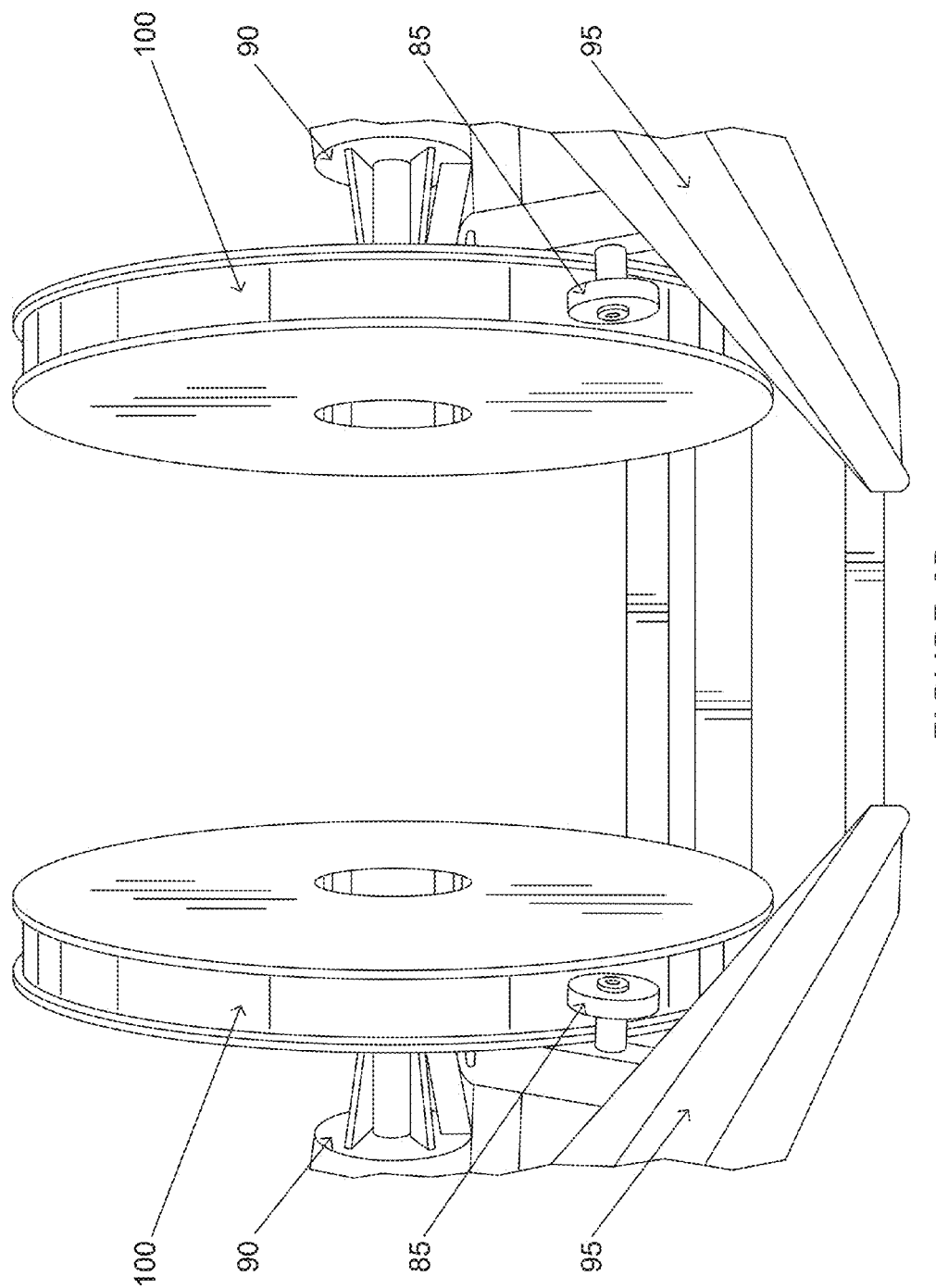
FIG. 4B is a front close-up view of the grain bag winder with the winding cores in a retracted position.

Referring to FIG. 4B, a front view of the grain bag winder without a grain bag is illustrated with the winder cores in a retracted position. As can be seen, the small wheel 85 on the left side of the illustration is closer to the internal side (i.e. near the gap between the plates) than to the external side of the plate 100. From this figure, it can also be seen that the guides 95 are in a deployed position. The edge of the guides 95 can be seen to be smooth to prevent an empty grain bag from catching or ripping as it is being rolled up.

From FIG. 4B, it should be clear that, once the empty grain bag has been rolled up, the winding cores can be retracted. Once the winding cores are retracted, the plates can slide away from each other. This causes the rolled up bag, previously captive between the two plates, to drop from between the plates. The elevator 20 can then be used to guide the rolled up grain bag on to the flat bed of a truck or on to the ground.

Figure 5:
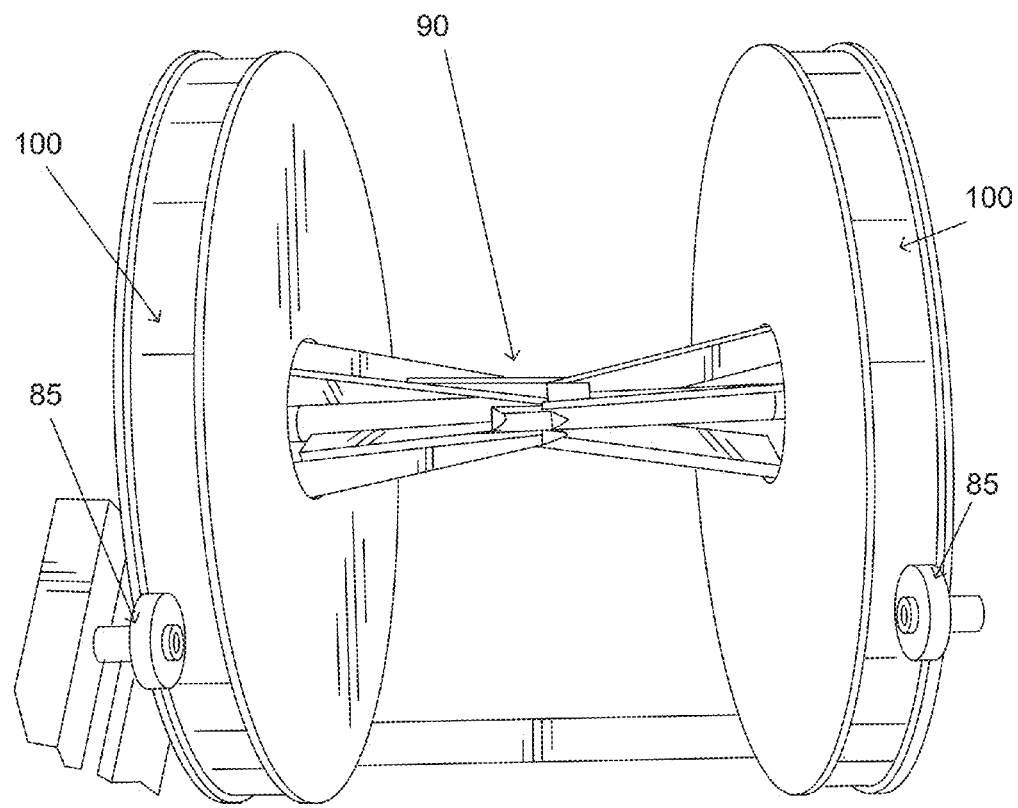
FIG. 5 is a front close-up view of the grain bag winder with the winding cores in a deployed position showing the interlocked winding cores.

Referring to FIG. 5, a front bottom view of the grain bag winder without a grain bag is illustrated. As can be seen, the interlocked or intertwined fingers of the winder cores are clearly illustrated. The end of a grain bag to be rolled up can be attached to the interlocked fingers. When the winder cores rotate due to the motor 60, the empty grain bag wraps around the winder cores. While the discussion notes two winder cores, a single winder core, also retractable, may be used. As noted above, when in a deployed position, the winder cores push the plates 100 to a predetermined position so that there is a predetermined first distance between the plates 100.

Also referring to FIG. 5, the small wheels 85 are also visible. As mentioned above, the plates 100 rest on these small wheels 85. It can be seen in FIG. 5 that the small wheels 85 are thinner than the plates 100. The plates 100 can slide along the axis of rotation of the small wheels 85. When the winding cores are deployed (as show in FIG. 5), the small wheels are adjacent to the external side of the plates. When the winding cores are retracted, the plates 100 can slide towards each other such that the small wheels 85 can then be adjacent the internal side of the plates. The effect of the slidability of the plates 100 is that, when the winding cores 90 are deployed, there is a fixed distance for the gap between the plates. When the winding cores are retracted, the plates 100 can slide away from each other to increase the distance of the gap between the plates.

Figure 6:
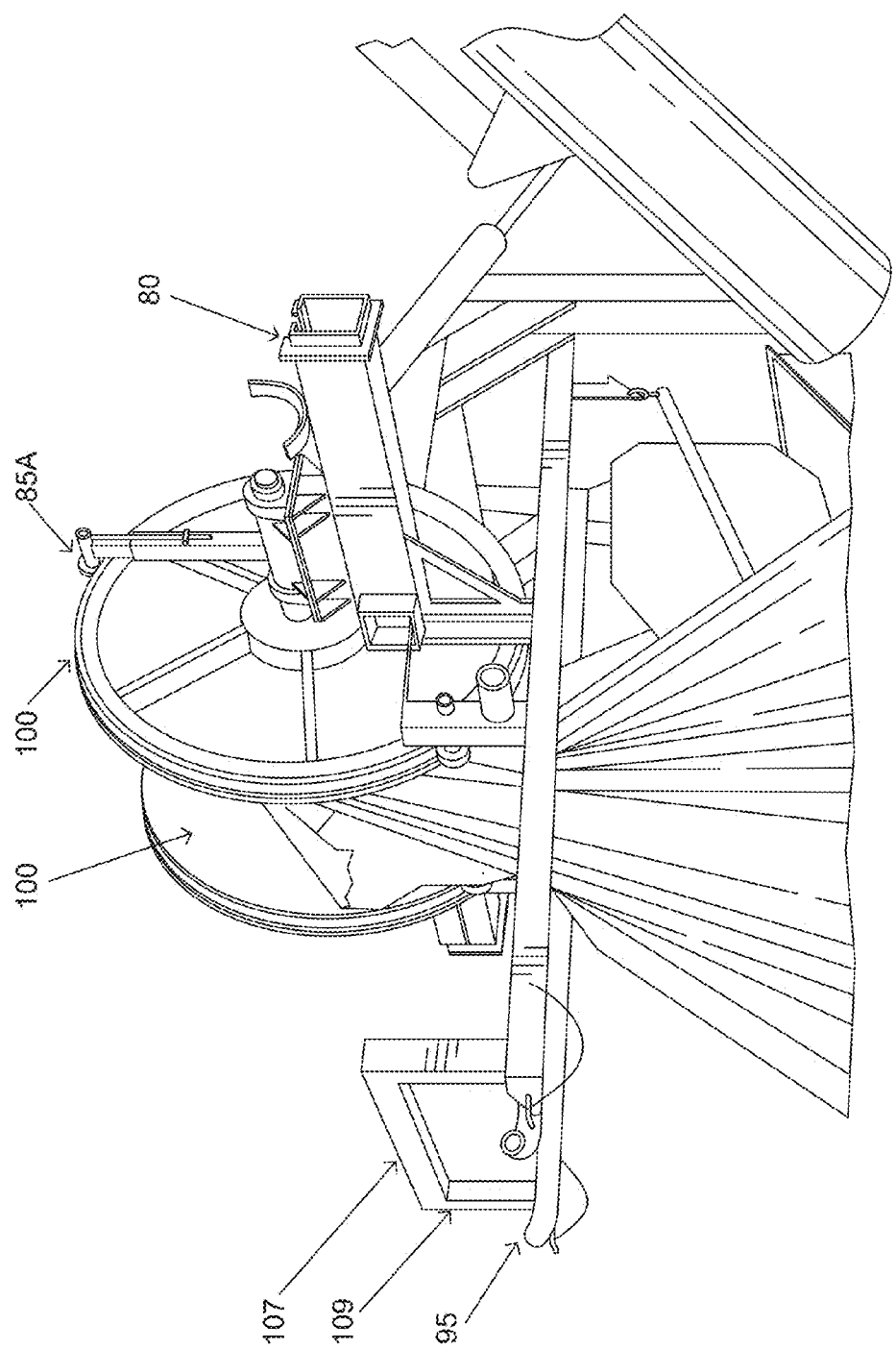
FIG. 6 is yet a further view of the grain bag winder in use.

Another side view of the grain bag winder in use is illustrated in FIG. 6. As can be seen, the empty portion of the grain bag is rolled up as the grain bag is emptied. Also visible from this angle is an extra small wheel 85A deployed closed to the top of the right plate 100. A similar small wheel may also be deployed for the left plate 100. The small wheel 85A deployed at the top of each plate 100 may be placed there for added stability and support for the plate 100.

Figure 7:
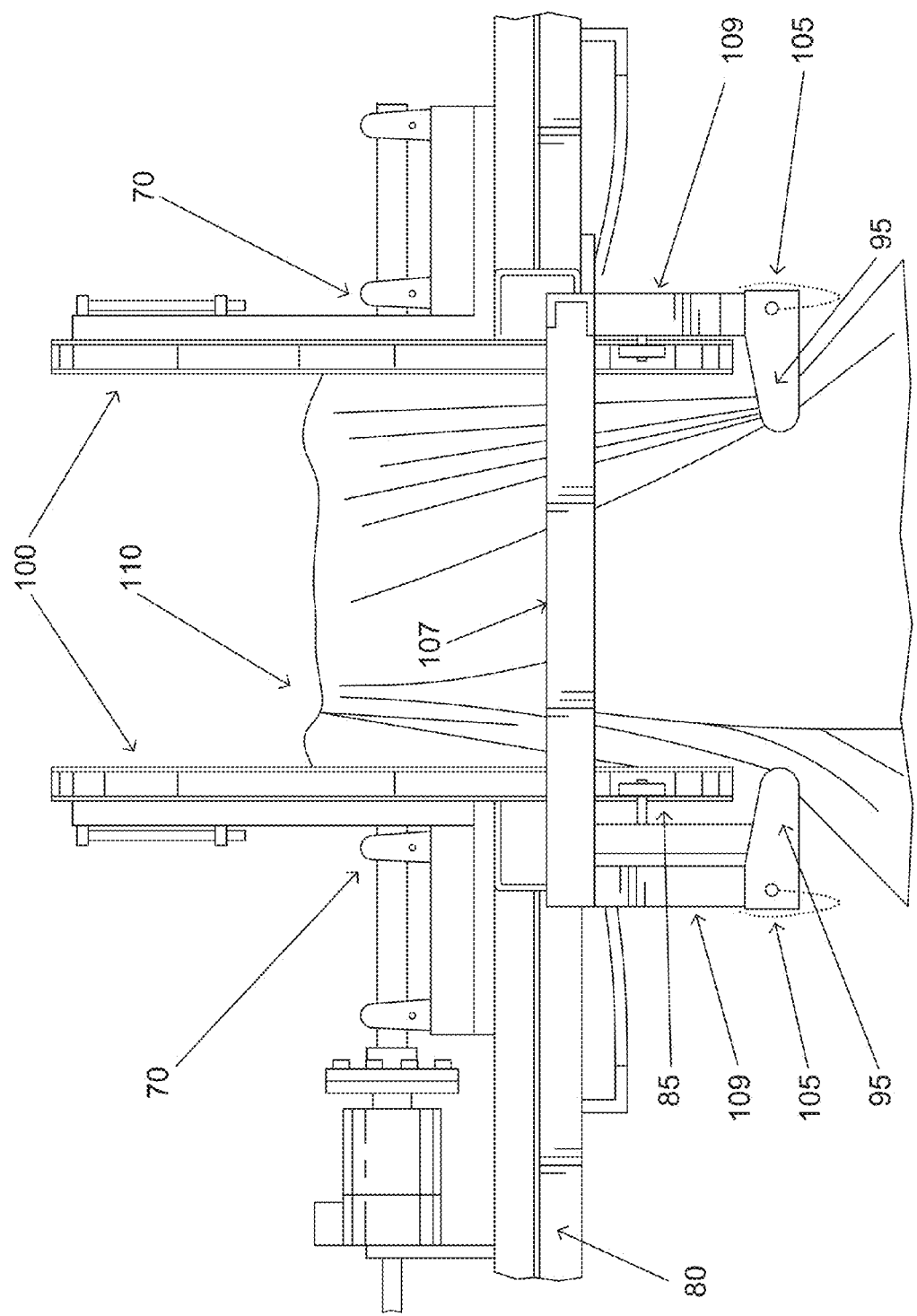
FIG. 7 is front view of the grain bag winder.

Referring to FIG. 7 a front view of the grain bag winder is illustrated. As can be seen, the empty grain bag 110 being rolled up passes between the arms 105 and the risers 109 and passes beneath the bridge 107. As the empty grain bag is rolled up around the interlocked or intertwined fingers, the rolled up portion is between the two plates 100. The two plates 100 act to keep the used grain bag in a suitable roll as the grain bag is rolled up. If the plates 100 were not present, the grain bag may not roll into a roll with a predefined width. With the plates 100, the used grain bag rolls into a roll with a predefined width. The predefined width is the distance between the plates 100 when the winding cores are deployed.

It should be noted that FIG. 7 also shows the guides 95 in a deployed position. As can be seen, the guides 95 guide the empty grain bag towards the rest of the rolled up grain bag to ensure a smooth and trouble free rolling up of the emptied grain bag. When in a deployed position (as seen in FIG. 4B), the guides 95 are pointed at each other. So that the emptied grain bag does not tear or catch, the outer edges of guides 95 (the edges which come into contact with the grain bag) are preferably rounded and relatively smooth.

Figure 8:
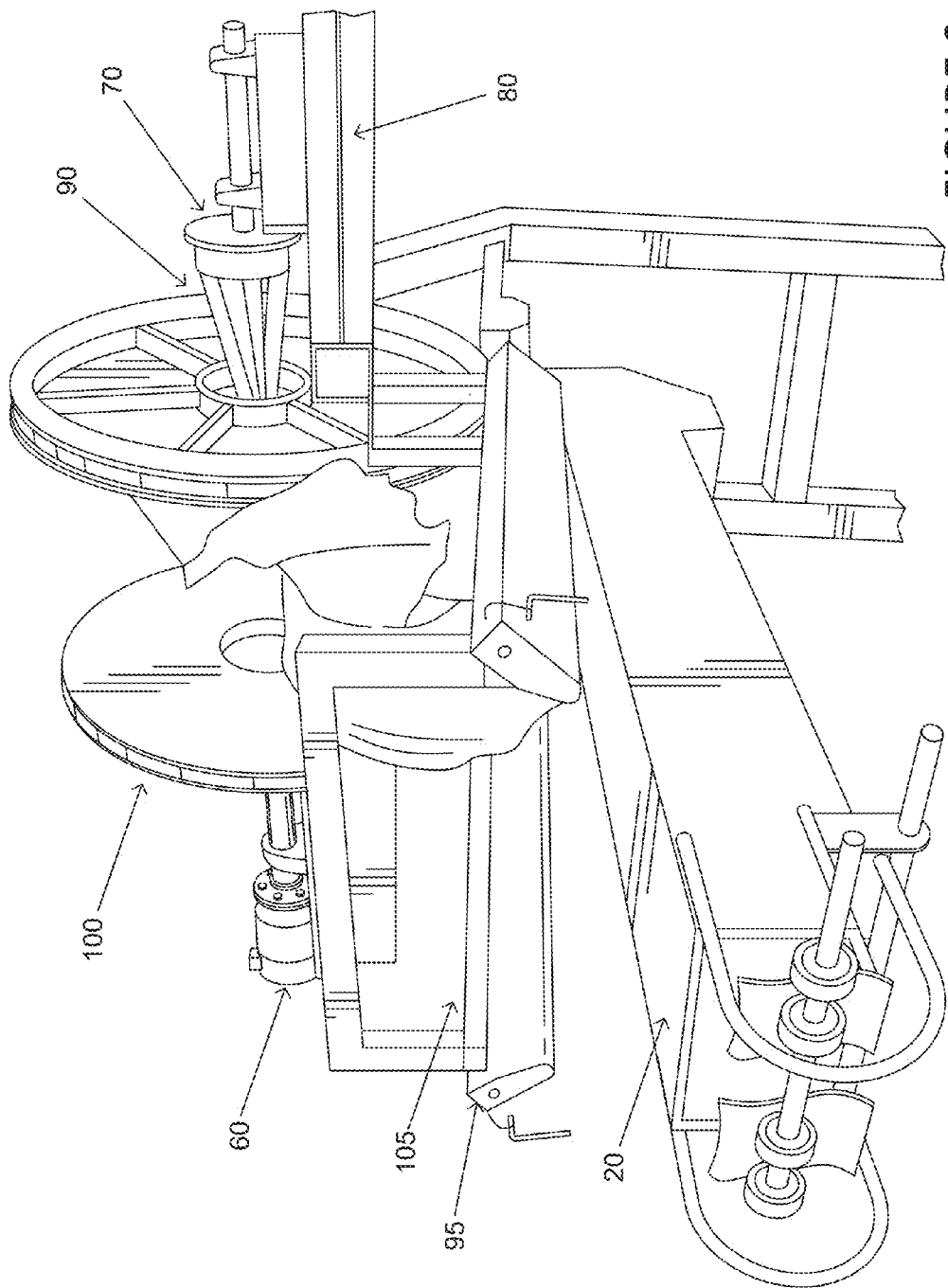
FIG. 8 is a side view of the grain bag winder with the winder cores retracted.

Referring to FIG. 8, a left front view of the grain bag winder is illustrated. The fingers 90 of the winder core can be clearly seen in the figure. It should be noted that FIG. 8 shows the situation where the empty grain bag has been rolled up and is ready for removal. The winder cores have been retracted and the retraction of these winder cores causes the rolled up grain bag to drop to the grain elevator 20. Since the grain elevator is raised, the rolled up grain bag does not roll off the elevator. Once the elevator 20 is lowered, the grain bag roll rolls off the elevator and, as the grain bag rolls off, it is guided by the arms 105 and the guides 95. As can be seen, the guides 95 are in a loose position.

It should be clear that the guides 95 are attached to and hinged to the arms 105. When in a loose position, the guides 95 open up and their smooth edges point to the ground at an angle as shown in FIG. 8. When in a deployed position (as shown in FIG. 4B), the smooth edges of the guides 95 point to each other.

Figure 9:
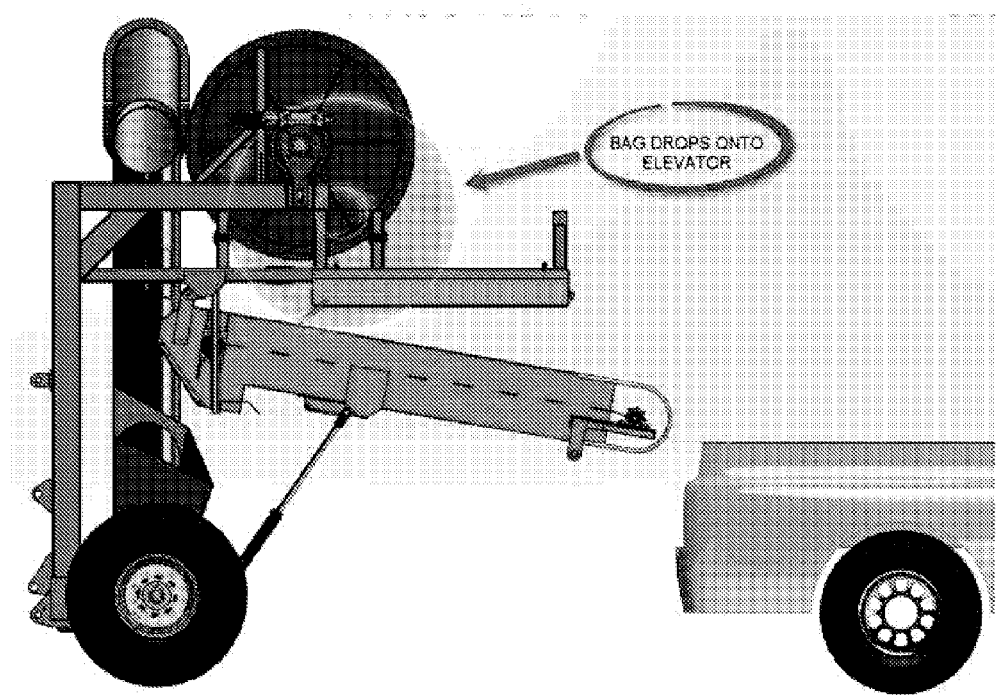
FIGS. 9-11 is a series of Figures illustrating the steps for removing the rolled grain bag from the grain bag winder.
Figure 10:
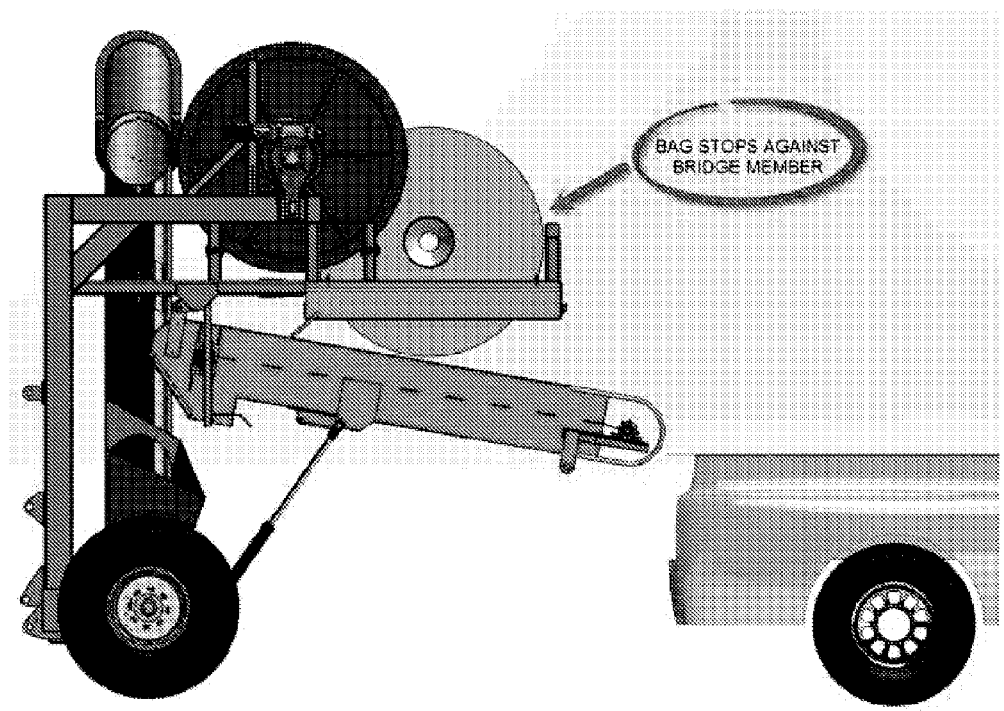
Figure 11:
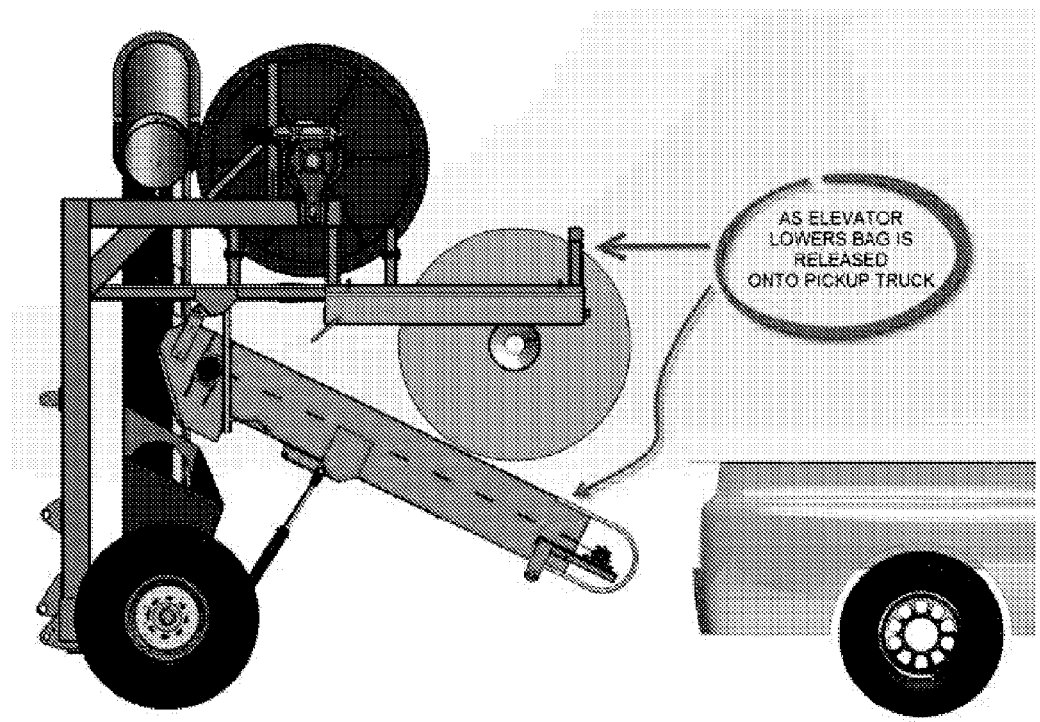

Referring to FIGS. 9-11, the sequence for conveniently removing the rolled up grain bag is illustrated. In FIG. 9, the rolled up bag is removed from the grain bag winder by retracting the winder cores from the rolled up grain bag. This causes the rolled up grain bag to fall on to the raised elevator. In FIG. 10, the rolled up grain bag rolls down the elevator and is stopped by the bridge 105. In FIG. 11, the elevator is lowered further and the rolled up grain bag can proceed to roll down the elevator and on to a transport vehicle for transporting the used grain bag.

It should be clear that while the Figures illustrate an embodiment with a single motor 60 for driving the winding cores, another implementation uses one motor to drive each winding core. Preferably, the motors are hydraulic motors driven in parallel from a single hydraulic circuit. By driving both motors off a single hydraulic circuit, the motors self-synchronize and issues can be avoided.

In another aspect of the invention, the grain extractor may be equipped with a remote control module for remotely controlling the various functions of the grain extractor.

More specifically, one aspect of the present invention relates to grain extractors which are provided with a wireless control panel for controlling the functions of the grain extractor remotely from the grain extractor. The wireless control panel communicates wirelessly with a control box on the grain extractor. The control box is wired, either directly or indirectly, to the various motors and controls on the grain extractor. The wireless control panel allows for various functions of the grain extractor to be controlled remotely. The remote control allows for various components of the grain extractor, such as the drive wheels, the auger lift cylinder, the elevator motor, and the winder motor, to be activated or deactivated remotely.

It should be noted that the grain extractor illustrated in FIG. 1 is only one example. Other grain extractors with similar components but with a different configuration are possible. The components for other grain extractors may be different from the components illustrated in FIG. 1.

Figure 12:
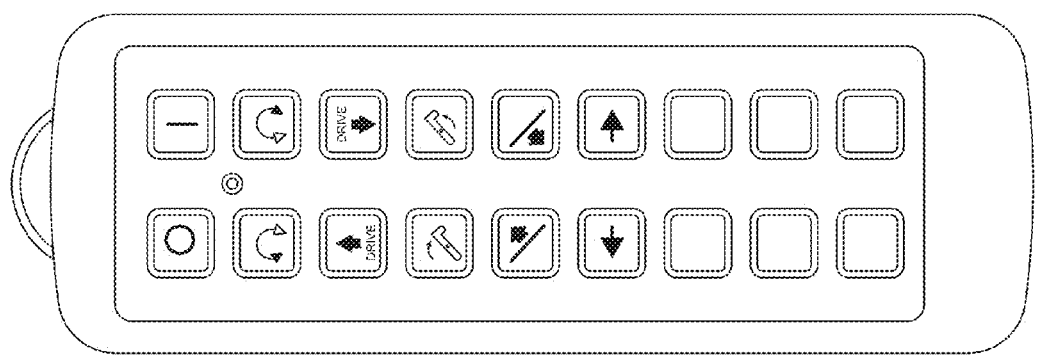
FIG. 12 is an illustration of a control panel according to another aspect of the invention.

Referring to FIG. 12, an illustration of a sample control panel is provided. Depending on the configuration, the control panel may be a wireless control panel or an auxiliary wired control panel. As a variant of the invention, the control panel may be a hybrid control panel which is both wired to the system and communicates wirelessly with the wireless module.

Figure 13:
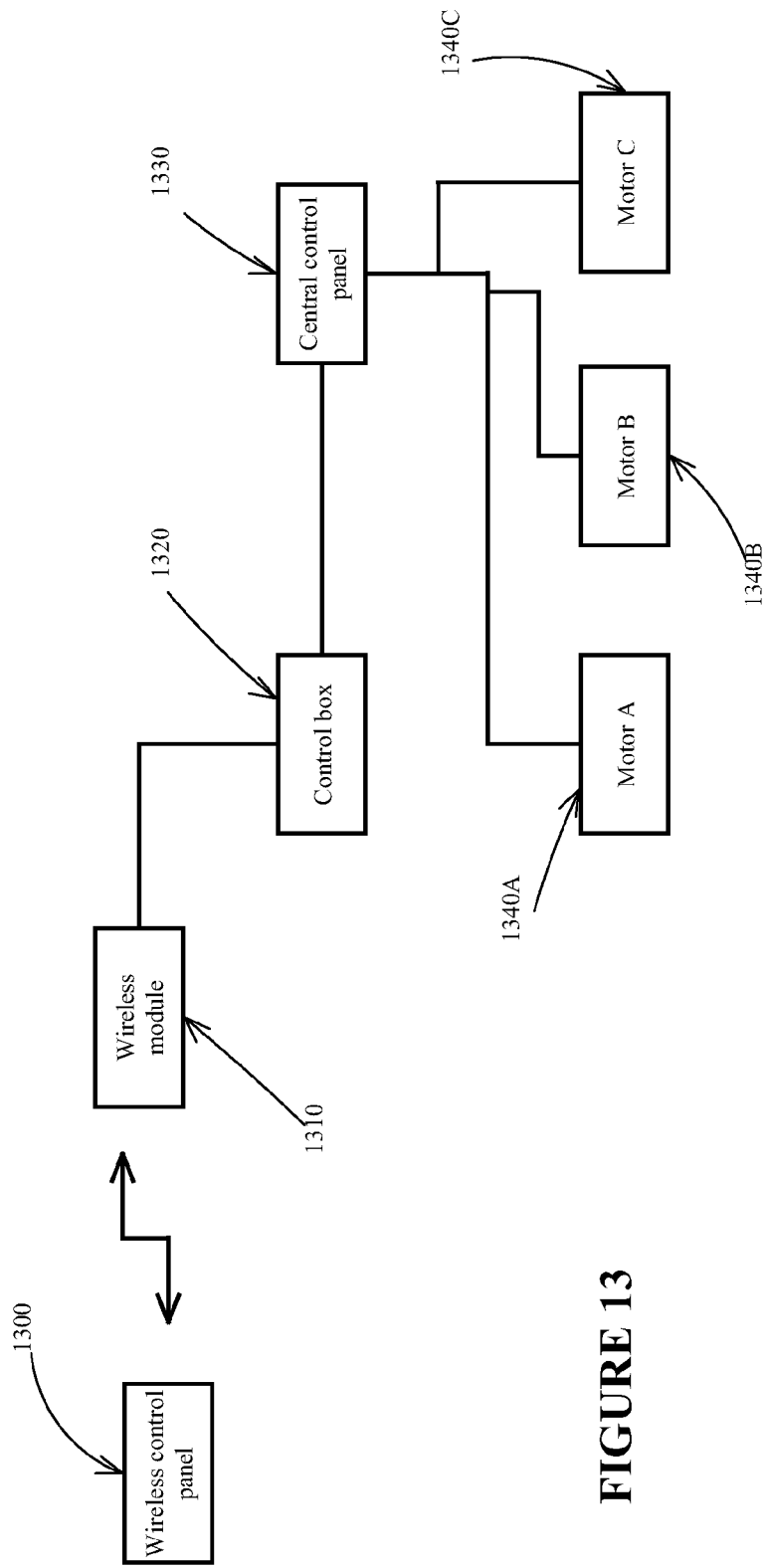
FIG. 13 is a block diagram of one configuration for a grain extractor with a wireless control panel.

Referring to FIG. 13, a block diagram of a configuration of the grain extractor with a wireless control panel is provided. As can be seen, the wireless control panel 1300 communicates wirelessly with a wireless module 1310. The wireless module 1310 is wired to a control box 1320 that determines which received command from the wireless control panel 1300 corresponds to which subsystem of the grain extractor. The control box 1320 is coupled to the central control panel 1330 on the grain extractor.

The system operates with the user using the wireless control panel 1300 to operate one of the components of the grain extractor. The wireless control panel 1300 sends a wireless signal to the wireless module 1310. The wireless module 1310 receives the wireless signal and transmits the command corresponding to the wireless signal to the control box 1320. The control box 1320 then interprets the command to determine which of the various components are to be controlled and what/how the component is to be controlled. Once the interpretation has been performed, the relevant controls on the central control panel 1330 are then operated, thereby causing the relevant motors 1340A, 1340B, 1340C to operate.

Figure 13A:
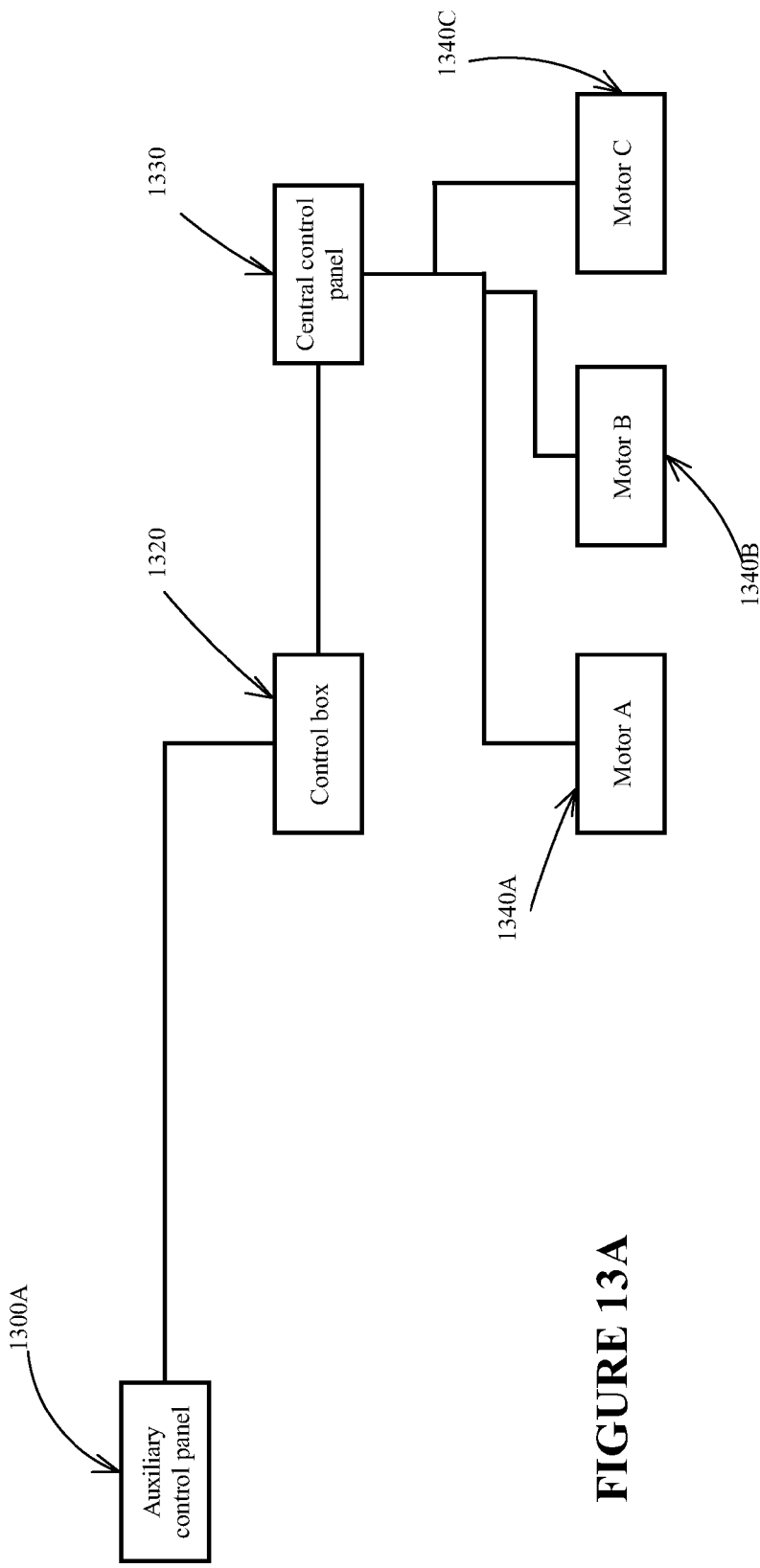
FIG. 13A is a block diagram of a variant of the configuration in FIG. 2 using a wired auxiliary control panel.

Among the various functions/components which can be controlled by the wireless control panel are the following:
1. Winder motor: winds up the bag onto the spool to create recyclable bale.
2. Drive wheel motors: walk extractor into the bag.
3. Auger lift cylinder: allows clearance for truck to drive into position and allows for adjustment of grain flow direction side to side on the truck
4. Spout sway: Allows adjustment of grain flow direction front to back on the truck
5. Elevator motor: Allows for adjustment of elevator paddle chain speed
6. Elevator lift cylinder: Allows lifting of elevator to form ramp for used grain bag dump onto transport vehicle for use in transporting the used grain bag It should be noted that the wireless characteristic of the wireless control panel 1300 is a preferred embodiment. In another embodiment, instead of a wireless control panel, a wired auxiliary control panel may be used in place of the wireless control panel. For this embodiment, a block diagram of which is illustrated in FIG. 13A, the wireless module 1310 has been removed and the auxiliary control panel 1300A is directly hard wired to the control box 1320.

It should further be noted that the central control panel 1330 may be equipped with a lock-out button or switch to lock out either the auxiliary control panel or the wireless control panel. The lock-out button or switch, when engaged, prevents the auxiliary control panel or the wireless control panel from operating any of the components of the grain extractor. A user who will be controlling the grain extractor from the central control panel 100 may engage the lock-out button to prevent others from accidentally operating the grain extractor. This can prevent conflicting commands or it can be used for safety purposes. Alternatively, to address potentially conflicting commands for the same component, commands from the central control panel can be set to override commands received from either the wireless control panel or the auxiliary control panel.

Figure 14:
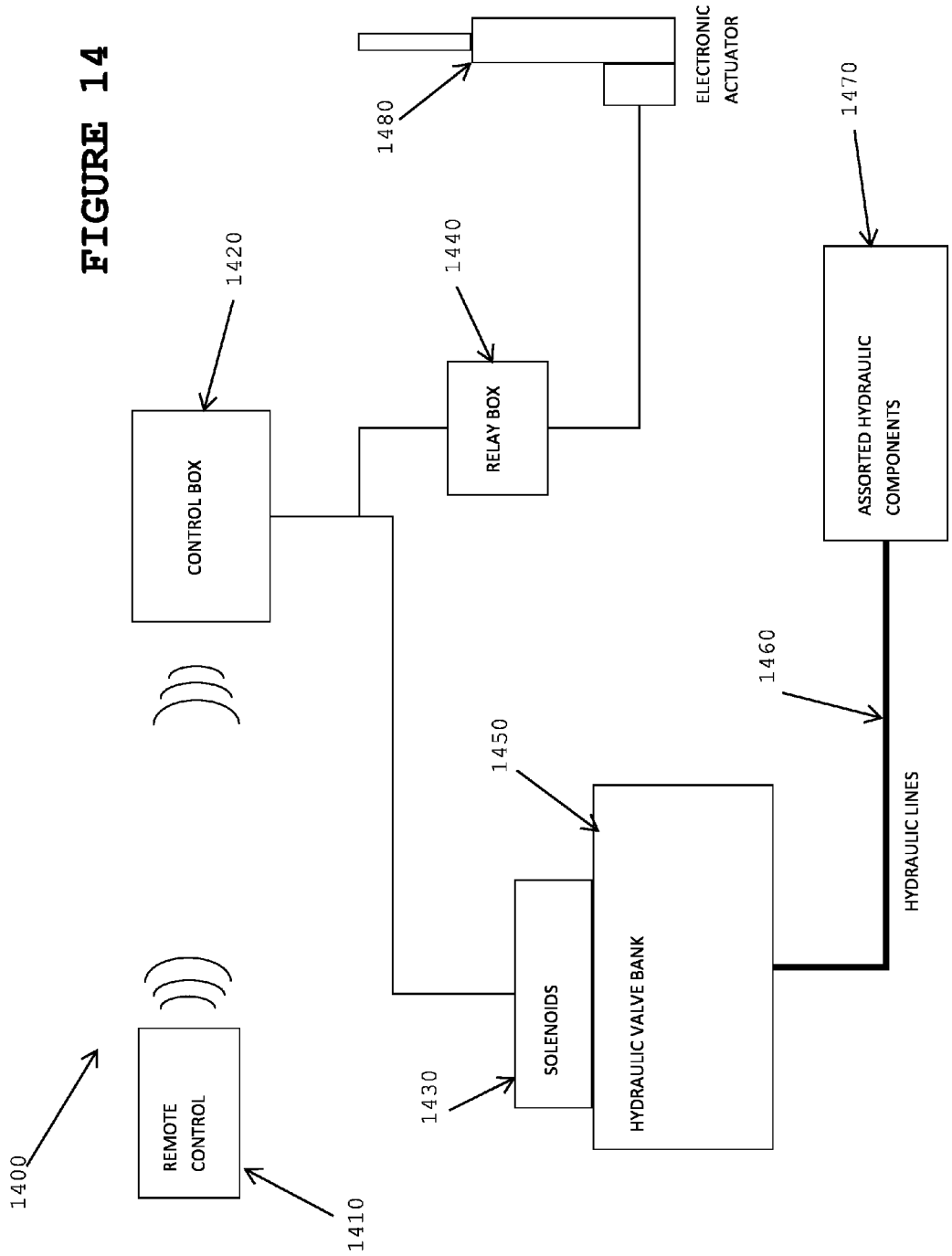
FIG. 14 is a detailed block diagram of a system according to another aspect of the invention.

Referring to FIG. 14, a more detailed block diagram of a wireless control system according to another aspect of the invention. The system 1400 has a remote control 1410 which communicates wirelessly with a control box 1420. The control box 1410 sends signals based on the received commands from the remote control 1410 to either solenoids 1430 on a valve bank or to a relay box 1440. If solenoids 1430 are activated, these in turn operate specific hydraulic valves in a hydraulic valve bank 1450. The valves in the valve bank 1450 in turn control the flow of hydraulic fluid through hydraulic lines 1460 to various assorted hydraulic components 1470. These components 1470 are then activated/deactivated/controlled by the hydraulic fluid flow. If, on the other hand, the relay box 1440 is activated by the control box, the relay box operates one or more electronic actuator(s) 1480 to activate/deactivate/control electronically actuated components.

Returning to FIG. 12, a sample remote control panel implementing the various functions enumerated above is illustrated.

A person understanding this invention may now conceive of alternative structures and embodiments or variations of the above all of which are intended to fall within the scope of the invention as defined in the claims that follow.

I claim:

1. A system for packaging a grain bag as said grain bag is emptied by a grain extractor, said grain extractor comprising a grain elevator, the system comprising:
   a pair of plates placed opposite one another, a gap between said plates having a predefined width, each plate having a void at a middle of said plate, said plates being positioned to cause said gap to be positioned above said grain elevator;
   at least one elongated winding core, each winding core having a deployed and a retracted position, each winding core being placed through at least one of said voids in a corresponding plate when in a deployed position, said at least one winding core being constructed and arranged to attach to said grain bag, said at least one winding core being rotatable about an axis perpendicular to said plates, said axis being parallel to a longitudinal axis of said at least one winding core; said axis being perpendicular to a longitudinal axis of said grain elevator;
   a pair of arms extending outwardly from said plates, said arms being for guiding said grain bag after said grain bag is released from said at least one winding core;
   a motor for rotating said at least one elongated winding core about said elongated winding core's longitudinal axis
   wherein
   said grain elevator pivots about a pivot axis located such that said pair of arms are on one side of a vertical plane containing said winding core's longitudinal axis and said pivot axis is on an opposite side of said vertical plane;
   said plates and said at least one winding core are located adjacent to and above said grain elevator;
   when each winding core is in a deployed position, each winding core is in said gap between said plates;
   each winding core transitions from said deployed position to said retracted position by being retracted from said void, each winding core travelling along said axis when transitioning from said deployed position to said retracted position;

when said at least one winding core rotates about its longitudinal axis, said grain bag is rolled about said at least one winding core;

retracting said at least one winding core after said grain bag has been rolled about said at least one winding core allows said rolled grain bag to fall from between said plates and onto said grain elevator, said rolled grain bag being guided down said grain elevator by said pair of arms.

2. A system according to claim 1 wherein said at least one elongated winding core comprises a pair of elongated winding cores, each one of said pair of winding cores being located adjacent a corresponding one of said pair of plates, each one of said pair of winding cores being placed through a corresponding void in said corresponding one of said pair of plates when said pair of winding cores are in a deployed position.

3. A system according to claim 2 wherein said pair of winding cores cooperate with each other when in a deployed position to form a single winding core about which said grain bag is rolled.

4. A system according to claim 3 wherein said pair of winding cores interlock with each other when in a deployed position.

5. A system according to claim 2 wherein each one of said pair of winding cores comprises a plurality of elongated fingers, each finger of each winding core protruding towards said other winding core.

6. A system according to claim 1 wherein said system comprises at least one track positioned perpendicular to said plates, each of said at least one elongated winding core running along said track when transitioning from said deployed position to said retracted position, said at least one track being perpendicular to said longitudinal axis of said grain elevator.

7. A system according to claim 2 wherein said motor directly drives only one of said pair of winding cores.

8. A system according to claim 1 wherein said grain extractor comprises:
    a central control panel for controlling components of said grain extractor; and
    a control box for receiving commands for said central control panel;
    wherein
    said control box receives said commands from a user operating a control panel remote from said grain extractor.

9. A system according to claim 8 wherein said control panel is a wireless control panel.

10. A system according to claim 8 wherein said control panel is an auxiliary control panel.

11. A system according to claim 8 wherein said central control panel is equipped with a lockout switch, said lockout switch preventing said control panel from operating said grain extractor when said lockout switch is engaged.

12. A grain extractor for extracting grain from a grain bag, the grain extractor comprising:
    a hopper for holding grain;
    a grain pipe for moving said grain from said hopper to a grain storage;
    an elongated grain elevator for moving said grain to said hopper, said grain elevator being pivotable about a pivot axis;
    an auger system for moving said grain from said grain bag to said grain elevator;
    a pair of plates placed opposite one another, each plate having a void at a middle of said plate, said pair of plates being separated by a gap, said plates being positioned to cause said gap to be positioned above said grain elevator;
    at least one elongated winding core, the or each winding core being for deployment through at least one of said voids, the or each winding core being retractable through said void;
    a pair of arms extending outwardly from said plates, said arms being for guiding said grain bag after said grain bag is released from said at least one winding core:
    wherein
    said at least one winding core being rotatable about its longitudinal axis to roll up said grain bag as said grain bag is emptied by said auger system;
    said pair of plates and said at least one winding core are positioned adjacent to and above said grain elevator;
    said pivot axis is located such that said pair of arms are on one side of a vertical plane containing a longitudinal axis of said winding core and said pivot axis is on an opposite side of said vertical plane;
    retracting said at least one winding core after said grain bag has been rolled about said at least one winding core allows said rolled grain bag to fall from between said plates and onto said grain elevator, said rolled grain bag being guided down said grain elevator by said pair of arms.

13. A grain extractor according to claim 12 further comprising a motor for rotating said at least one winding core.

14. A grain extractor according to claim 12 wherein said at least one elongated winding core comprises a pair of elongated winding cores, said pair of winding cores cooperating with each other when deployed.

15. A grain extractor according to claim 14 wherein each one of said pair of winding cores comprises a plurality of elongated fingers, each finger of each winding core protruding towards said other winding core.

16. A grain extractor according to claim 12 wherein said grain extractor system comprises at least one track positioned perpendicular to said plates and to a longitudinal axis of said grain elevator, said at least one track being for said at least one elongated winding core to run along when said at least one winding core is being retracted or deployed.

17. A grain extractor according to claim 12 wherein each arm of said pair of arms has attached a guide for guiding said grain bag as said grain bag is being rolled on to said winding cores.

* * * * *